(12) United States Patent
Ayyasamy

(10) Patent No.: US 10,718,435 B2
(45) Date of Patent: Jul. 21, 2020

(54) COMPRESSIBLE SEAL FOR SEALING AN INTERFACE BETWEEN A RECREATIONAL VEHICLE SLIDE OUT AND A RECREATIONAL VEHICLE FRAME

(71) Applicant: GDC, Inc., Goshen, IN (US)

(72) Inventor: Suresh Ayyasamy, Goshen, IN (US)

(73) Assignee: GDC, INC., Goshen, IN (US)

( * ) Notice: Subject to any disclaimer, the term of this patent is extended or adjusted under 35 U.S.C. 154(b) by 311 days.

(21) Appl. No.: 15/918,551

(22) Filed: Mar. 12, 2018

(65) Prior Publication Data
US 2019/0277407 A1 Sep. 12, 2019

(51) Int. Cl.
*F16J 15/52* (2006.01)
*B60P 3/34* (2006.01)
*B60J 10/84* (2016.01)

(52) U.S. Cl.
CPC .............. *F16J 15/52* (2013.01); *B60J 10/84* (2016.02); *B60P 3/34* (2013.01)

(58) Field of Classification Search
CPC .............. F16J 15/52; B60J 10/84; B60P 3/34
USPC ................... 296/165, 172, 176, 26.09, 26.13
See application file for complete search history.

(56) References Cited

U.S. PATENT DOCUMENTS

| 2,864,460 A | 12/1958 | Powers |
| 3,967,023 A | 6/1976 | Lysek |
| 4,558,718 A * | 12/1985 | Garfield ................ F16K 3/0245 137/614.11 |
| 6,966,590 B1 * | 11/2005 | Ksiezopolki ............... B60P 3/34 296/26.01 |
| 7,614,676 B2 | 11/2009 | Ksiezopolski et al. |
| 7,614,677 B2 | 11/2009 | Ksiezopolski et al. |
| 9,038,322 B2 | 5/2015 | Ksiezopolski |
| 2002/0078634 A1* | 6/2002 | McManus ................ B60J 10/00 52/67 |
| 2016/0114715 A1 | 4/2016 | Newhouse |
| 2016/0137170 A1 | 5/2016 | Dame et al. |

* cited by examiner

*Primary Examiner* — Joseph D. Pape
(74) *Attorney, Agent, or Firm* — Dickinson Wright PLLC

(57) ABSTRACT

A compressible seal that can be used for sealing an interface between a movable object an a stationary object is described. Also described is a method of sealing an interface between a recreational vehicle slide out and the frame of the recreational vehicle.

19 Claims, 8 Drawing Sheets

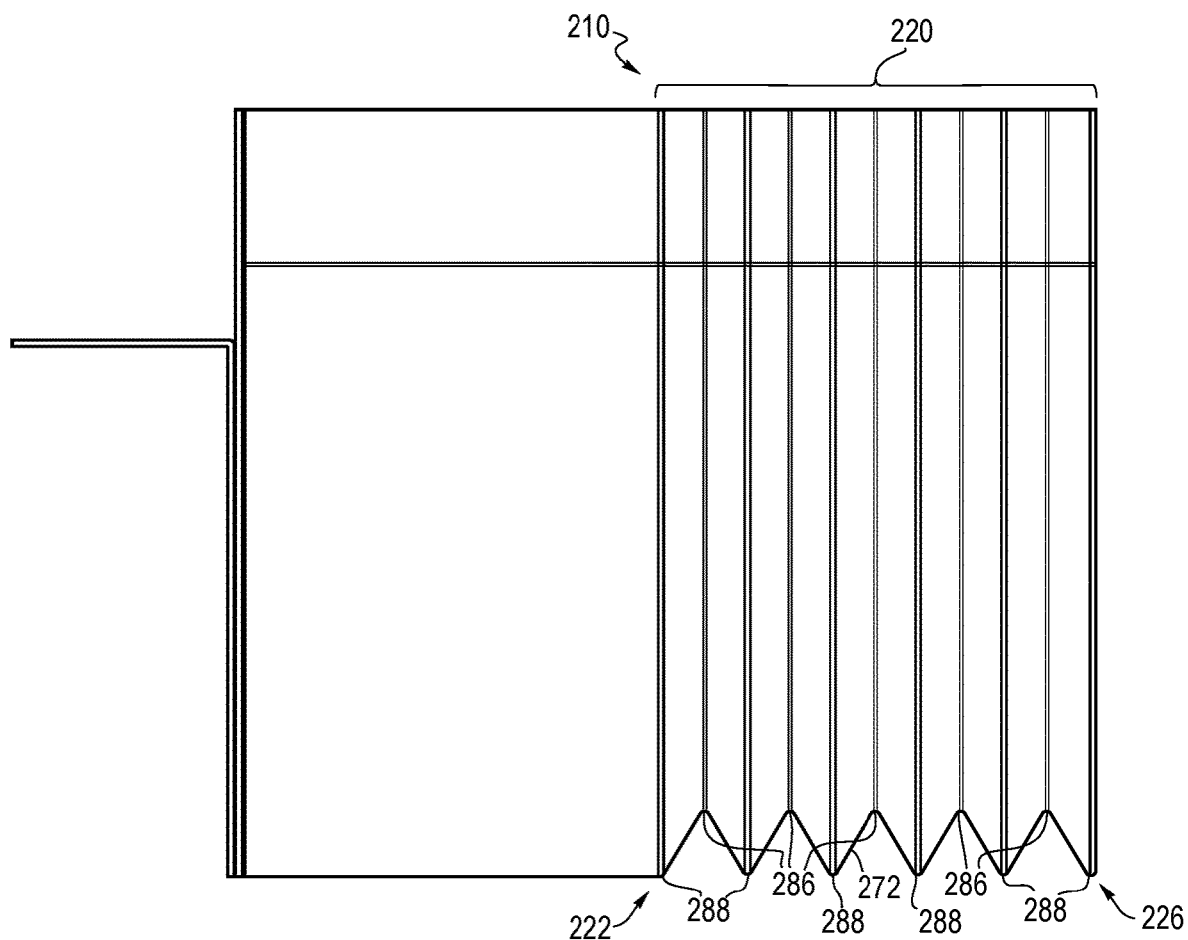

COMPRESSIBLE SEAL FOR SEALING AN INTERFACE BETWEEN A RECREATIONAL VEHICLE SLIDE OUT AND A RECREATIONAL VEHICLE FRAME

BACKGROUND

The task of sealing an interface between a movable object and a stationary object is a persistent challenge in the field of mechanical engineering. The "slide outs" utilized in many recreational vehicles represent an application where this challenge arises. In recreational vehicles having slide outs, one or more portions of the side wall can slide out to an extended position when the vehicle is parked and slide back to a retracted position when the vehicle is in motion. Slide outs are used to provide additional living space inside the recreational vehicle when the vehicle is parked.

FIG. 1 depicts a recreational vehicle 10 having a slide out 20 in its passenger side wall. Although slide outs, such as the slide out 20, provide additional living space inside the recreational vehicle, water, air, insects, and light can enter the interior of the recreational vehicle through gaps between the slide out and the frame of the recreational vehicle. Conditioned air from inside the recreational vehicle can also leak out through the same gaps. For example, in the recreational vehicle 10, leakage can occur through gaps at the top 22, sides 24, or base 26 of the slide out 20. To prevent such leakage, various types of seals have been proposed and utilized. See, e.g., U.S. Pat. Nos. 7,614,676, 7,614,677, and 9,038,322; U.S. Publication Nos. 2016/0114715, 2016/0137170. Notwithstanding the existing seal technology, further improvements can be made.

SUMMARY

The present disclosure relates to a compressible seal that can be used for sealing a movable object to a stationary object and for filing gaps between the movable object and the stationary object. In one aspect, the disclosure relates to a compressible seal, comprising a compressible body having a first end and a second end, the compressible body comprising: a plurality of pleated side members extending from the first end to the second end and having pleated top edges; and a plurality of transverse members extending between adjacent pleated side members and having transverse top edges; wherein the compressible body is compressible when acted upon by a compression force acting in a compression direction from the second end toward the first end. Among other applications, the compressible seal is useful for sealing an interface between a recreational vehicle slide out and the frame of the recreational vehicle.

The present disclosure also relates to a method of sealing an interface between a recreational vehicle slide out and the frame of the recreational vehicle. In one aspect, the disclosure relates to a method for sealing a recreational vehicle slide out having a base and a face panel to a recreational vehicle frame, comprising securing a compressible seal to the frame under the base of the slide out, the compressible seal comprising a compressible body having a first end and a second end, the compressible body comprising: a plurality of pleated side members extending from the first end to the second end and having pleated top edges; and a plurality of transverse members extending between adjacent pleated side members and having transverse top edges; wherein the compressible body is compressible when acted upon by a compression force acting in a compression direction from the second end toward the first end; wherein the compressible seal is positioned such that the base of the slide out slides over the pleated top edges and the transverse top edges, and the face panel compresses the compressible body, when the slide out moves from an extended position to a retracted position.

BRIEF DESCRIPTION OF THE DRAWINGS

FIG. 3C is a side view of a compressible seal in accordance with a second aspect of the disclosure.

DETAILED DESCRIPTION

In one aspect, the disclosure relates to a compressible seal for sealing an interface between a movable object, such as a recreational vehicle slide out, and a stationary object, such as a recreational vehicle frame, and for filling a gap between the movable and stationary objects. For illustrative purposes, the following description of the compressible seal makes reference to the compressible seal 210 depicted in FIGS. 3A-F. However, it will be understood that the disclosure is not limited to the embodiment depicted in FIGS. 3A-F.

Figure 3A:
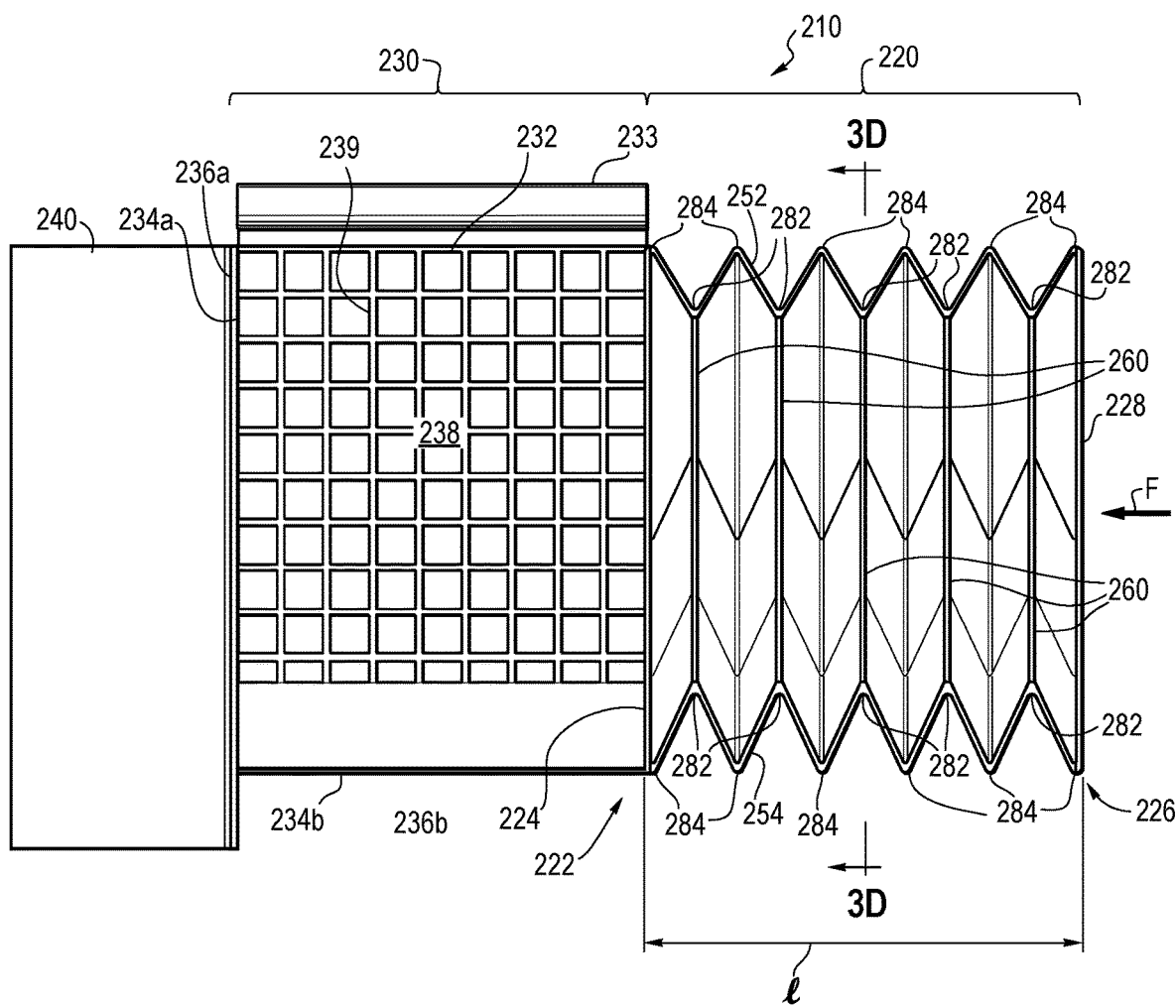
FIG. 3A is a top view of a compressible seal in accordance with a second aspect of the disclosure.

Referring to FIG. 3A, the compressible seal 210 includes a compressible body 220 having a first end 222 and a second end 226. The compressible body 220 includes a plurality of pleated side members 252 and 254 extending from the first end 222 to the second end 226 and a plurality of transverse members 260 extending between adjacent pleated side members 252 and 254. The compressible body 220 is compressible when acted upon by a compression force F acting in a compression direction from the second end 226 toward the first end 222. Thus, for example, when the first end 222 of the compressible body 220 is secured to a stationary object, and a movable object presses against the second end 226 and moves toward the first end 222, the compressible body 220 is compressed from an expanded configuration (as shown in FIG. 3A) to a compressed configuration (not shown).

The magnitude of the compression force F required to compress the compressible body 220 may be controlled, at least in part, by the stiffness of the pleated side members 252 and 254. For example, stiffer pleated side members 252 and 254 may require a stronger compression force F to compress the compressible body 220.

The pleated side members 252 and 254 may also impart stability to the compressible body 220. In some embodiments, the compressible body 220 has sufficient stability to substantially avoid sagging when not supported, such as when the first end 222 of the compressible body 220 is attached to another object, such as a recreational vehicle frame (either directly or through a non-compressible body, as described below), and the compressible body 220 extends substantially horizontally from the other object, but the compressible body 220 otherwise is not supported.

The pleated side members 252 and 254 may be separate from one another (as shown in FIG. 3A), or two or more pleated side members 252 and 254 may be joined to one another at the bottom of the compressible body 220. For example, adjacent pleated side members 252 and 254 may be joined in a U-shape or V-shape, with the plurality of transverse members 260 extending between the legs of the "U" or "V." In such cases, each leg of the "U" or "V" is considered to be a separate pleated side member. Two or more pleated side members 252 and 254 may also be joined to one another at the first and/or second end 222 and/or 226 of the compressible body 220.

Figure 3B:
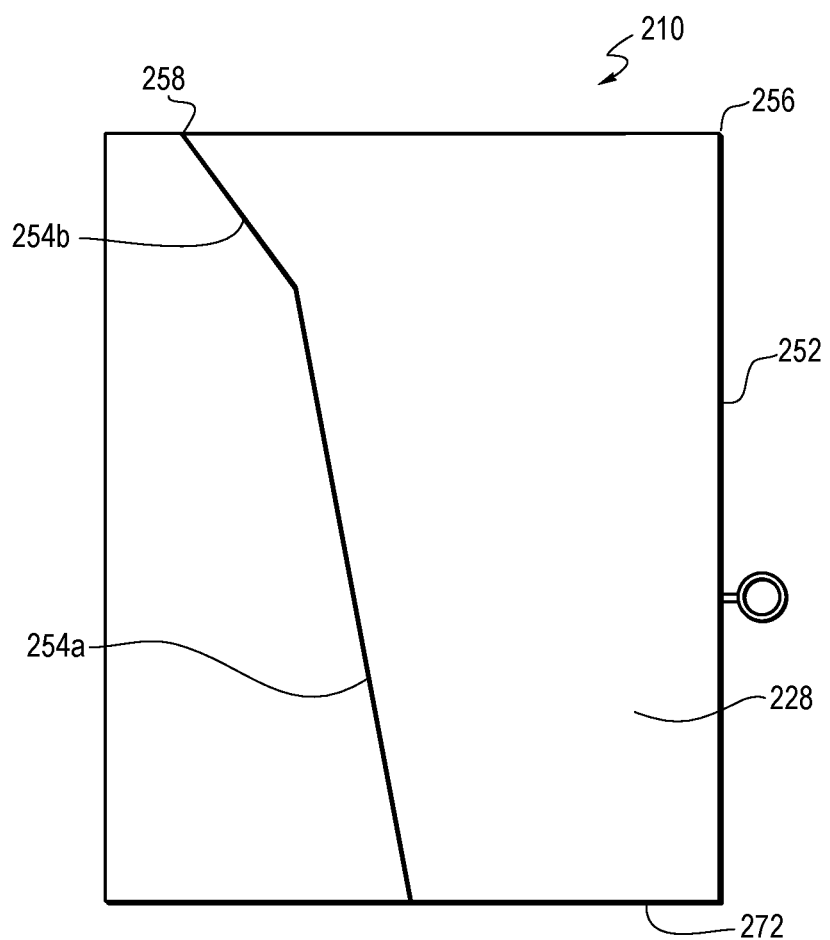
FIG. 3B is a front view of a compressible seal in accordance with a second aspect of the disclosure.

As shown in FIG. 3B, the pleated side members 252 and 254 (represented as 254a and 254b in FIG. 3B) have top edges 256 and 258, referred to herein as "pleated top edges," extending from the first end 222 of the compressible body 220 to the second end 226 of the compressible body 220. In some embodiments, the pleated top edge 256 or 258 of a given pleated side member 252 or 254 lies substantially in a single plane such that the pleated top edge 256 or 258 can slide smoothly across a substantially planar surface, such as the base of a recreational vehicle slide out. In some embodiments, the pleated top edges 256 and 258 of multiple pleated side members 252 and 254 are substantially coplanar. In some embodiments, the pleated top edges 256 and 258 of all of the pleated side members 252 and 254 are substantially coplanar.

In some embodiments, one or both of the pleated side members 252 and 254 comprise a bottom portion and a top portion, and the top portion(s) of the pleated side member(s) is/are flared outward, such that the angle(s) of the top portion(s), relative to vertical (when viewed from the perspective shown in FIG. 3B), is/are greater than the angle(s) of the bottom portion(s). For example, in the embodiment shown in FIG. 3B, the top portion 254b of the pleated side member 254 is flared outward relative to the bottom portion 254a. This flared design allows the top of the pleated side member 254 to flex outward more readily when a downward force is applied to the pleated top edge 258.

The compressible body may have two, three, four, five, six, seven, eight, nine, ten, or more pleated side members. In some embodiments, the compressible body has two pleated side members. In some embodiments, the compressible body has three, four, five, six, seven, eight, nine, or ten pleated side members.

Referring again to FIG. 3A, the pleated side members 252 and 254 (and, thus, the compressible body 220) can be of any length I, as measured along a straight line from the first end 222 to the second end 226 of the compressible body 220 when the compressible body 220 is in an expanded configuration, as shown in FIG. 3A. In particular embodiments, the lengths of the pleated side members 252 and 254 are determined by the application, and particularly the amount of space to be filled by the seal 210 when the seal 210 is in an expanded configuration. In some embodiments, the lengths of the pleated side members 252 and 254, and thus the length of the compressible body 220, are between 1 inch and 20 inches, between 2 inches and 10 inches, between 2.5 inches and 7 inches, or between 3 inches and 5 inches.

The pleated side members 252 and 254 can have any number of segments and, correspondingly, any number of pleats 282 and 284. The number of segments (and pleats 282 and 284) depends on the width of the segments (measured from pleat to pleat), the desired length of the pleated side members 252 and 254, and the angles of the pleats 282 and 284. The angles of the pleats 282 and 284 (when the compressible body 220 is in an expanded configuration, as shown in FIG. 3A) typically is between about 10° and 160°, between about 20° and 120°, between about 30° and about 90°, or between about 40° and about 70°. Pleated side members 252 and 254 having smaller pleat angles typically compress more easily than pleated side members 252 and 254 having larger pleat angles.

The pleats 282 and 284 of the pleated side members 252 and 254 allow the compressible body 220 to compress when a compression force is applied to the second end 226 toward the first end 222. When a compression force F is applied, the angles of the pleats 282 and 284 decrease, which results in a decrease in the distance between the first end 222 and the second end 226 of the compressible body 220 (i.e., a compressed configuration). When the angles of the pleats reach approximately 0°, substantial further compression generally is not possible (except by deformation of or damage to the material making up the compressible seal), and the compressible body 220 is said to be in a fully compressed configuration. Advantageously, the compressible body 220 can be compressed to any compressed configuration between the expanded configuration and the fully compressed configuration, such that the compressible body 220 can fill a range of gap sizes and accommodate a range of manufacturing tolerances between the movable object and the stationary object.

In some embodiments, adjacent pleated side members 252 and 254 are substantially parallel to one another (when viewed in their totalities, ignoring the angles of the individual segments). In other embodiments, the pleated side members 252 and 254 are closer together at the bottom of the compressible body 220 than at the pleated top edges 256 and 258 of the pleated side members 252 and 254. In other embodiments, the pleated side members 252 and 254 are closer together at the pleated top edges 256 and 258 of the pleated side members 252 and 254 than at the bottom of the compressible body 220. In still other embodiments, the pleated side members 252 and 254 are closer together at the second end 226 of the compressible body 220 than at the first end 222 of the compressible body 220. In still other embodiments, the pleated side members 252 and 254 are closer together at the first end 222 of the compressible body 220 than at the second end 226 of the compressible body 220.

The pleated side members 252 and 254 can have any thickness, and adjacent pleated side members 252 and 254 may have the same or different thicknesses. In some embodiments, the thickness of the pleated side members 252 and 254 is selected, in combination with the material used to manufacture the pleated side members 252 and 254, to provide a compressible body 220 having a desired stiffness. In some embodiments, the thickness of the pleated side members 252 and 254 is between 0.01 inches and 0.25 inches.

The transverse members 260 extend between adjacent pleated side members 252 and 254 and may be joined to the pleated side members 252 and 254, thereby stabilizing the compressible body 220. For example, the transverse members 260 may prevent the compressible body 220 from twisting and may prevent the pleated side members 252 and 254 from splaying outward when a compression force F is applied to the second end 226 of the compressible body 220.

Figure 3D:
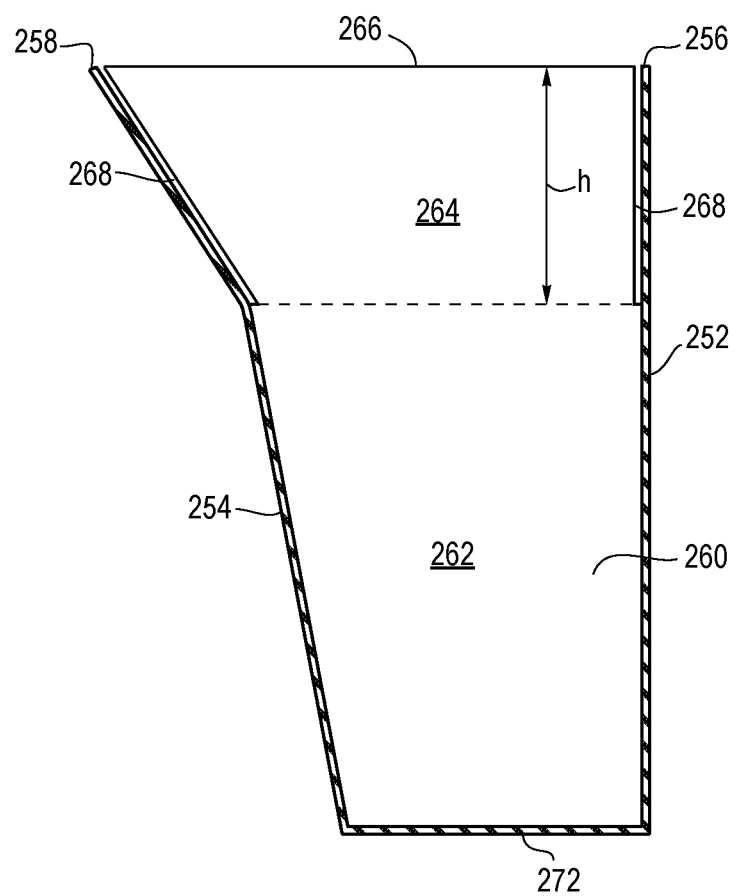
FIG. 3D is a cross-sectional view of the compressible seal shown in FIG. 3A.
Figure 3E:
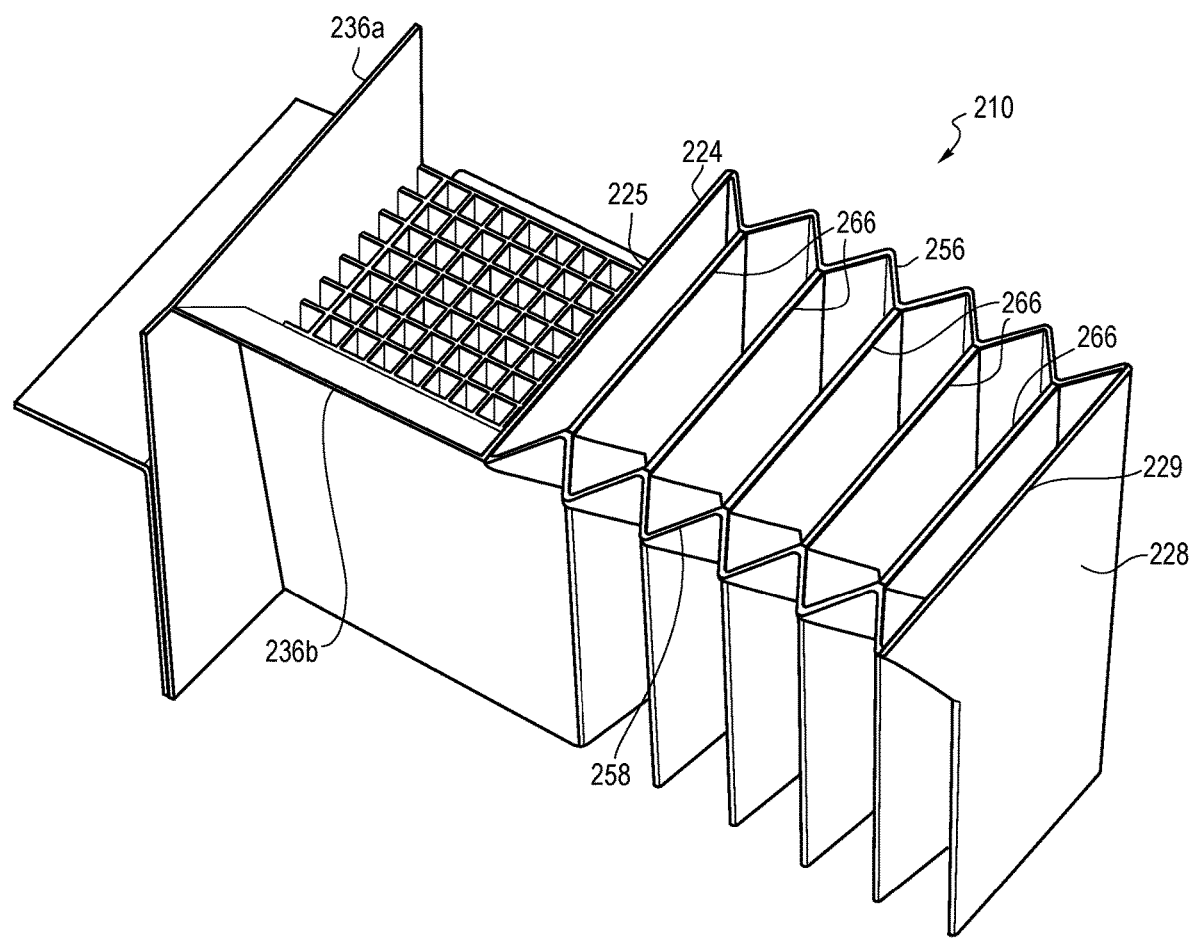
FIG. 3E is a perspective view of a compressible seal in accordance with a second aspect of the disclosure.

Referring now to FIG. 3E, the transverse members have top edges 266, referred to herein as "transverse top edges," extending between the pleated side members. In some embodiments, the transverse top edge 266 of a given transverse member is substantially straight. In some embodiments, the transverse top edges 266 of multiple transverse members are substantially coplanar. In some embodiments, the transverse top edges 266 of all of the transverse members are substantially coplanar. In some embodiments, the pleated top edges 256 and 258 and the transverse top edges 266 are substantially coplanar, such that a substantially planar surface (such as the base of a recreational vehicle slide out) can slide smoothly across the pleated top edges 256 and 258 and transverse top edges 266. This configuration allows the compressible seal 210 to block light and/or water from passing between the compressible seal 210 and the substantially planar surface.

Referring again to FIG. 3A, the transverse members 260 extending between adjacent pleated side members 252 and 254 may extend between inward pleats 282 of the pleated side members 252 and 254, between outward pleats 284 of the pleated side members 252 and 254 (not shown), or between a mixture of inward and outward pleats 282 and 284 of the pleated side members 252 and 254 (not shown). For example, a given transverse member 260 may extend from an inward pleat 282 of one pleated side member 252 or 254 to an inward pleat 282 of an adjacent pleated side member 252 or 254, from an outward pleat 284 of one pleated side member 252 or 254 to an outward pleat 284 of an adjacent pleated side member 252 or 254 (not shown), or from an inward pleat 282 of one pleated side member 252 or 254 to an outward pleat 284 of an adjacent pleated side member 252 or 254 (not shown). In some embodiments, all of the transverse members 260 extend between inward pleats 282, between outward pleats 284, or between a mixture of inward and outward pleats 282 and 284 of adjacent pleated side members 252 and 254.

The transverse members 260 may be substantially parallel to one another, or they may be oriented at an angle to one another. In addition, adjacent transverse members 260 may be separated by any distance, and the distance between each set of adjacent transverse members 260 may be the same or different. In some embodiments, the distances between adjacent transverse members 260 are between 0.25 inches and 3 inches, between 0.4 inches and 2 inches, or between 0.5 inches and 1 inch.

The transverse members 260 can have any thickness, and may have the same or different thicknesses. In addition, the transverse members 260 can have the same or different thicknesses as compared to the pleated side members 252 and 254. In some embodiments, the thickness of the transverse members 260 is selected, in combination with the material used to manufacture the transverse members 260, to provide transverse members 260 having a desired stiffness. In some embodiments, the thickness of the transverse members 260 is between 0.01 inches and 0.25 inches.

The compressible body 220 may have any number of transverse members 260. For example, the compressible body 220 may have two, three, four, five, six, seven, eight, nine, ten, or more transverse members 260. In some embodiments, transverse members 260 extend between each of the inward pleats 282 of adjacent pleated side members 252 and 254, such that the number of transverse members 260 is the same as the number of inward pleats 282 of each pleated side member 252 and 254.

The transverse members 260 may have any length, and the lengths of the individual transverse members 260 may be the same or different. The lengths of the transverse members 260 may determine the distance between adjacent pleated side members 252 and 254. In particular embodiments, the lengths of the transverse members 260, and the corresponding distances between adjacent pleated side members 252 and 254, are determined by the application for which the compressible seal 210 will be used. In some embodiments, the lengths of the transverse side members 260 are substantially the same from the first end 222 to the second end 226 of the compressible body 220, such that the distance between adjacent pleated side members 252 and 254 is substantially constant from the first end 222 to the second end 226. In other embodiments, the lengths of the transverse members 260 decrease from the first end 222 to the second end 226 of the compressible body 220 (not shown), such that the distance between adjacent pleated side members 252 and 254 decreases from the first end 222 to the second end 226. In still other embodiments, the lengths of the transverse members 260 increase from the first end 222 to the second end 226 of the compressible body 220 (not shown), such that the distance between adjacent pleated side members 252 and 254 increases from the first end 222 to the second end 226.

Referring now to FIG. 3D, the transverse members 260 may have any shape. In some embodiments, the transverse members 260 are rectangular (not shown), such that the distance between adjacent pleated side members 252 and 254 is the same at the top and bottom of the pleated side members 252 and 254. In other embodiments, the lengths of the transverse top edges 266 are different than the lengths of the bottom edges of the transverse members 260, such that the distance between adjacent pleated side members 252 and 254 is different at the top and bottom of the pleated side members 252 and 254. In some embodiments, the transverse members 260 are trapezoidal in shape, such that adjacent pleated side members 252 and 254 slope inward or outward (depending on the orientation of the transverse members 260). In some embodiments, the top edges 266 of the transverse members 260 are between 1 inch and 10 inches in length, between 1.5 inches and 5 inches in length, or between 2 and 3 inches in length.

In some embodiments, the transverse members 260 have joined portions 262 joined to the pleated side members 252 and 254 and free portions 264 extending from the joined portions 262 to the transverse top edges 266. The free portions 264 may be free to flex independently of the pleated side members 252 and 254 when a substantially planar surface, such as the base of a recreational vehicle slide out, slides across the transverse top edges 266 of the transverse members 260. The free portions 264 of the transverse members 260 may be formed when the compressible body 220 is manufactured, or the free portions 262 may be formed after manufacturing by cutting a slit 268 between the top portions of the transverse members 260 and the adjoining pleated side members.

The free portions 264 of the transverse members 260 may have any height h, as measured from the joined portion 262 to the transverse top edge 266, provided that the compressible body 220 maintains suitable stiffness and stability. In some embodiments the height of the free portions 264 is between 0.1 inches and 3 inches, between 0.2 inches and 2 inches, or between 0.5 inches and 1 inch.

Referring now to FIGS. 3B and 3C, the compressible body 220 may further comprise a pleated bottom member 272 extending between adjacent pleated side members 252 and 254 and from the first end 222 to the second end 226. In some embodiments, the pleated bottom member 272 has a plurality of pleats (or folds) that point upward 286 toward the transverse members and a plurality of pleats (or folds) that point downward 288. In those embodiments where the transverse members 260 are joined to the pleated side members 252 and 254, the joined portions 262 of the transverse members 260 may also be joined to the pleated bottom member 272, such as to the upward-pointing pleats 286 of the pleated bottom member 272.

Referring again to FIG. 3A, the compressible seal 210 may further comprise a non-compressible body 230 joined to the first or second end 222 or 226 of the compressible body 220. In some embodiments (not shown), the compressible seal comprises non-compressible bodies joined to both the first and second ends of the compressible body. The inclusion of a non-compressible body 230, with the compressible body 220, is useful when it is desirable for the compressible seal 210 to fill a gap that is larger than the compressible body 220 would fill when the compressible body 220 is in a fully compressed configuration. In such circumstances, the non-compressible body 230 fills the remaining portion of the gap to be filled. Thus, the length of the non-compressible body 230 may be determined by subtracting the length of the compressible body 220 (measured from the first end 222 to the second end 226, in a fully compressed configuration) from the space to be filled by the compressible seal 210. In some embodiments, the length of the non-compressible body 230 is between 0.5 inches and 10 inches, between 1 inch and 5 inches, or between 2 inches and 3 inches. In some embodiments, the width of the non-compressible body 230 is the same as the width of the compressible body 220.

In some embodiments, the non-compressible body comprises a rigid base 232 and one or more flaps 234 (e.g., 234a and 234b). The length of the rigid base 232 defines the length of the non-compressible body 230. Each flap 234 extends from the rigid base 232 to a flap top edge 236 (e.g., 236a and 236b). In some embodiments, the pleated top edges 256 and 258, the transverse top edges 266, and the flap top edges 236 are substantially coplanar, such that a substantially planar surface, such as the base of a recreational vehicle slide out, can slide smoothly across the top of the compressible seal 210. This configuration allows the compressible seal 210 to block light and/or water from passing between the compressible seal 210 and the substantially planar surface.

Figure 3F:
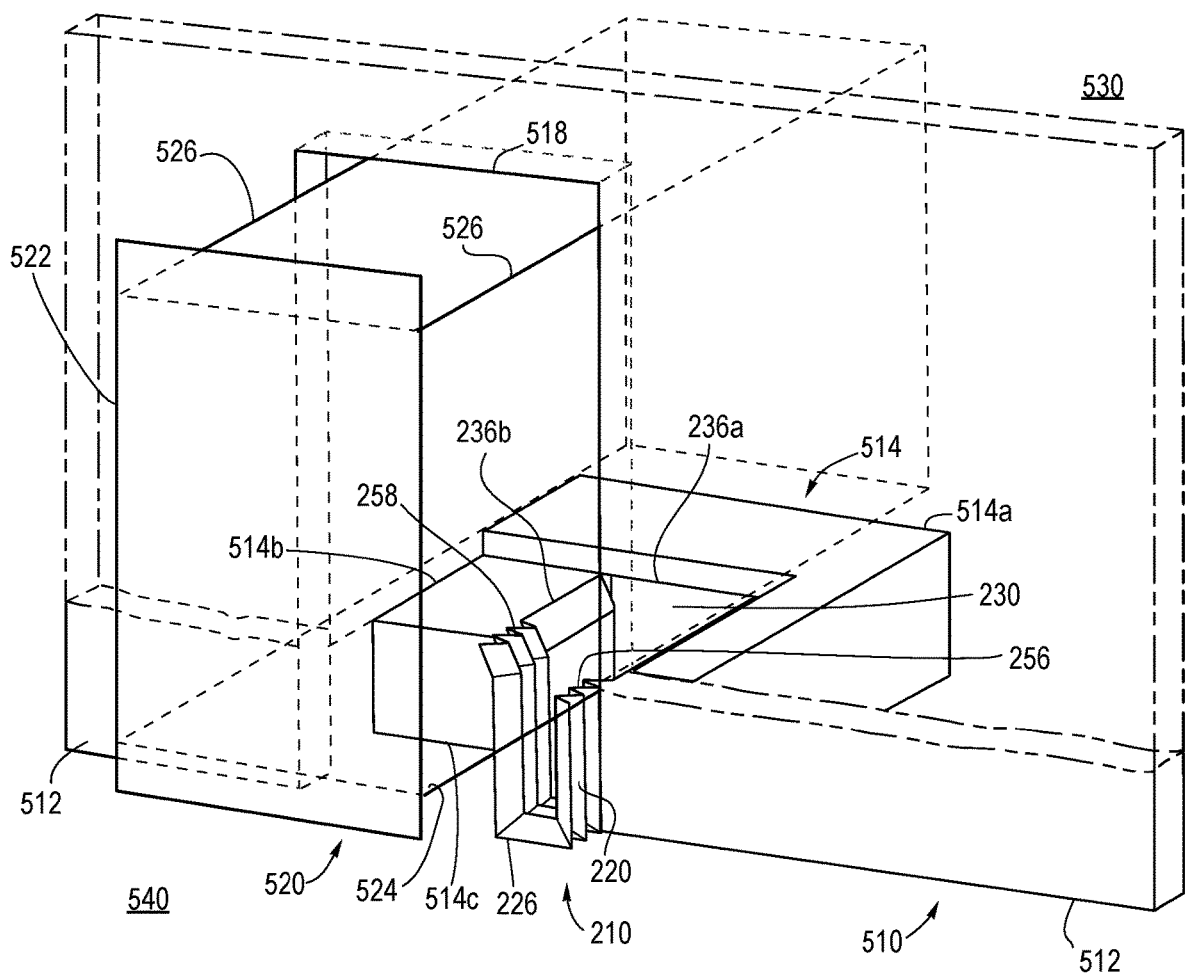
FIG. 3F is an environmental perspective view of a compressible seal in accordance with a second aspect of the disclosure mounted to a recreational vehicle frame.

Referring now to FIG. 3F, in another aspect, the disclosure relates to a method for sealing an interface between a recreational vehicle slide out 520 and a recreational vehicle frame 510. In practicing the method, the compressible seal 210 of any one of the preceding embodiments is secured to the recreational vehicle frame 510 under the base 524 of the slide out 520 with the first end of the compressible body 220 proximal to the frame 510 and the second end 226 of the compressible body 220 distal to the frame 510. The compressible seal 210 is positioned such that the base 524 of the slide out 520 slides over the pleated top edges 256 and 258 and the transverse top edges (not shown), and the face panel 522 of the slide out 520 compresses the compressible body 220 when the slide out 520 moves from an extended position to a retracted position.

The compressible seal may be manufactured from any material known in the art that has sufficient flexibility to allow the compressible body to compress upon application of a compression force to the second end of the compressible body and sufficient resilience and/or elasticity to re-assume its prior shape when the force is removed. Examples of suitable materials include without limitation polyolefines (e.g., polyethylene, polypropylene, etc.), thermoplastic elastomers (TPEs), thermoplastic olefins (TPOs), and the like.

The compressible seal may be manufactured by any technique known in the art, including without limitation joining of die cut components, injection molding, 3-dimensional printing, thermoforming, and the like.

Definitions

Unless the context dictates otherwise, the following terms shall have the following meanings.

As used herein, the term "pleated" refers to a material made up of multiple segments of similar or different width joined at a series of alternating pleats (or folds) between the segments.

As used herein, the term "inward pleats," when referring to adjacent pleated side members, refers to pleats (or folds) in a pleated side member that point toward the adjacent pleated side member.

As used herein, the term "outward pleats," when referring to adjacent pleated side members, refers to pleats (or folds) in a pleated side member that point away from the adjacent pleated side member.

As used herein, the term "joined" (or "joining"), when referring to two elements of the compressible seal described herein, means that the elements are connected by any means known in the art. For example, the elements may be joined by adhesive bonding, welding, sutures, nails, screws, rivets, or the elements may be unitarily formed from a common material (e.g., by moulding or 3-dimensional printing).

As used herein, directional terms, such as "up," "down," "top," "bottom," "left," "right," "vertical," and "horizontal" are arbitrary and/or refer to the frame of reference of the figure that they are being used to describe and are not intended to exclude objects viewed in a different orientation.

As used herein, the term "member" refers to a constituent piece of a larger structure.

As used herein, the term "substantially coplanar," when referring to multiple elements of the compressible seal described herein, means that the elements lie approximately in the same plane. Due to the flexible nature of the compressible seal elements, a person or ordinary skill would understand that strict mathematical coplanarity is not required.

As used herein, the term "substantially straight," when referring to an edge, means that all points along the edge lie approximately on the same line. Due to the flexible nature of the compressible seal elements, a person or ordinary skill would understand that strict mathematical linearity is not required.

As used herein, the term "substantially parallel," when referring to two planes, means that the planes are approximately parallel. Due to the flexible nature of the compressible seal elements, a person or ordinary skill would understand that strict mathematical parallelism is not required.

As used herein, the term "rigid," when referring to an element of the compressible seal described herein, means substantially non-compressible and inflexible when acted upon by a force sufficient to compress the compressible body.

As used herein, the terms "proximal" and "distal" refer to elements that are nearer to (proximal) or further from (distal) a given element.

As used herein, the term "expanded configuration," when referring to the compressible body of the compressible seal described herein, refers to the configuration of the compressible body when it is not being acted on by a compression force. The term does not imply a configuration in which the compressible body is forcibly stretched to expand the pleated side members.

As used herein, the term "compressed configuration," when referring to the compressible body of the compressible seal described herein, refers to the configuration of the compressible body when it is being acted on by a compression force, such that the distance between the first and second ends of the compressible body is less than when the compressible body is in the expanded configuration.

As used herein, the term "fully compressed configuration," when referring to the compressible body of the compressible seal described herein, refers to the configuration of the compressible body when it is being acted on by a compression force and is fully compressed.

Embodiments of the Disclosure

The following embodiments of the compressible seal described above are provided for purposes of illustration and are not intended to limit the scope of the disclosure or the claims.

Figure 1:
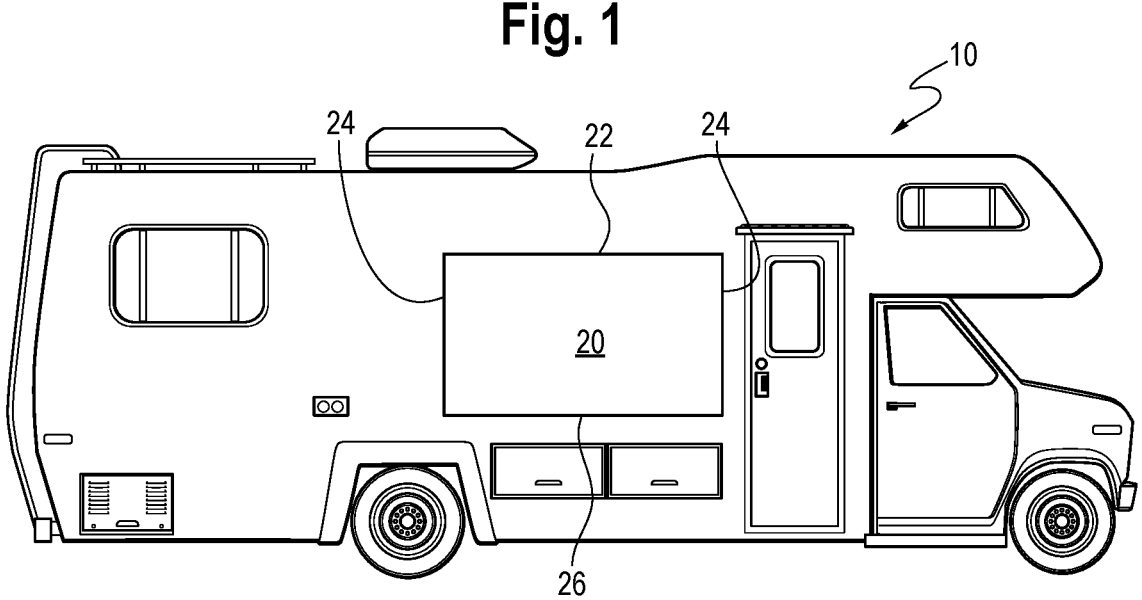
FIG. 1 is a side view of a recreational vehicle having a slide out.
Figure 2A:
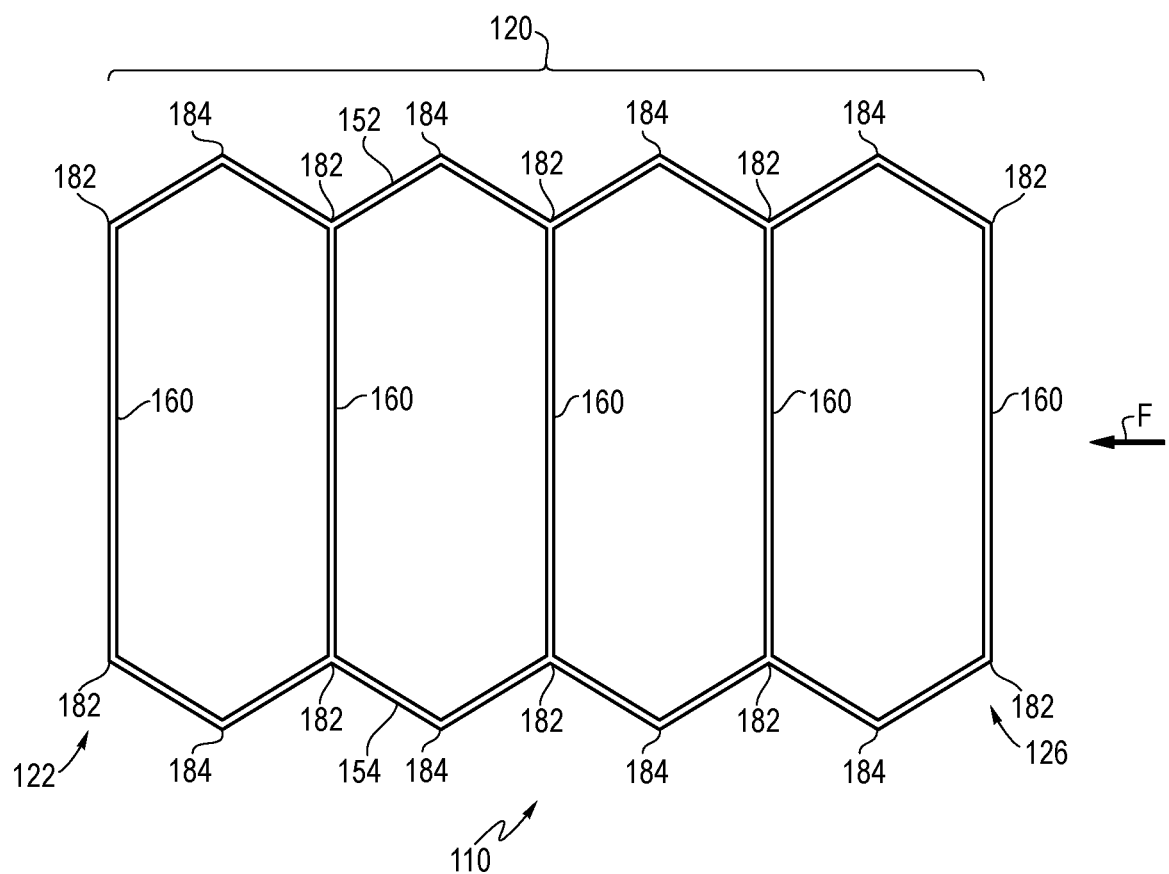
FIG. 2A is a top view of a compressible seal in accordance with one aspect of the disclosure.
Figure 2B:
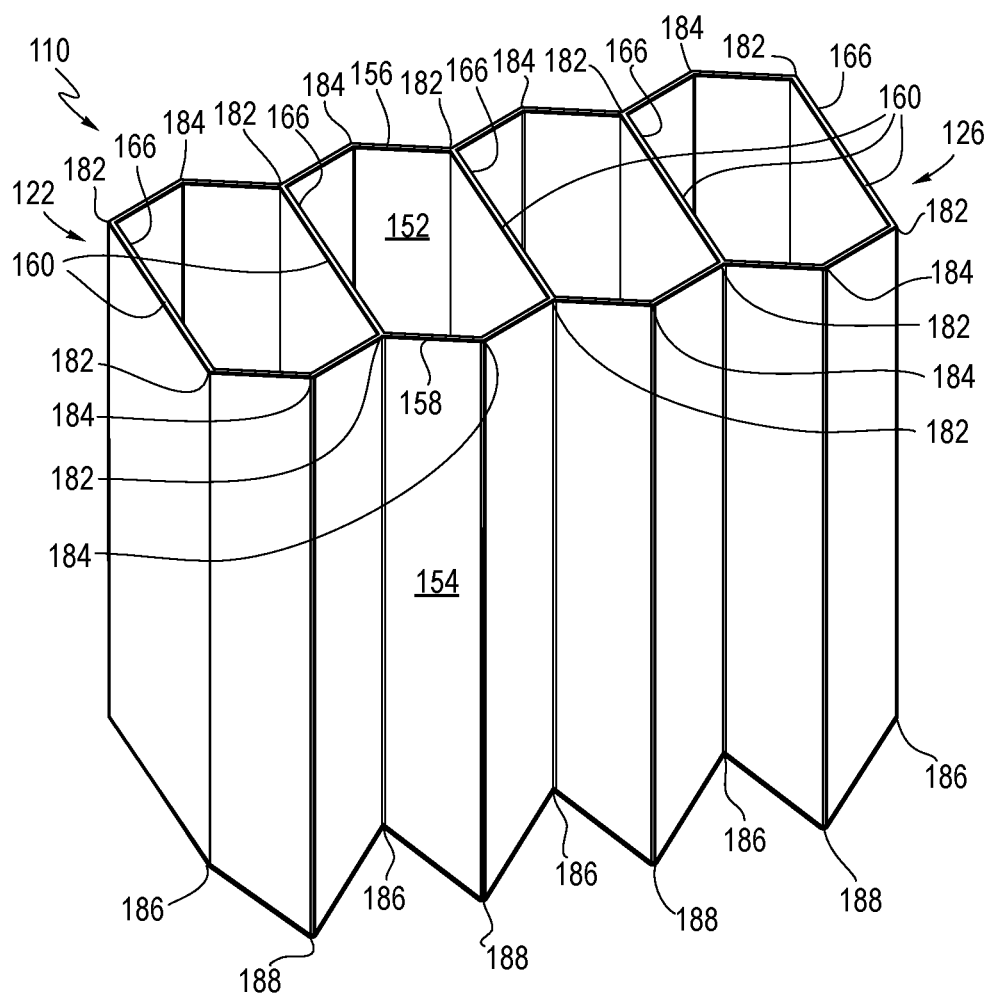
FIG. 2B is a perspective view of a compressible seal in accordance with one aspect of the disclosure.

FIGS. 2A-B depict a compressible seal 110 in accordance with an embodiment of the disclosure. Among other applications, compressible seal 110 is useful for sealing an interface between the base of a recreational vehicle slide out and the frame of the recreational vehicle.

Referring to FIG. 2A, the compressible seal 110 comprises a compressible body 120, which has a first end 122 and a second end 126. The compressible body 120 comprises a first pleated side member 152 and a second pleated side member 154. The first and second pleated side members 152 and 154 extend from the first end 122 to the second end 126 of the compressible body 120. The first and second pleated side members 152 and 154 comprise a plurality of alternating inward pleats 182 and outward pleats 184. The pleated structure of the first and second pleated side members 152 and 154 allows the compressible body 120 to compress when a force F is applied to the second end 126 of the compressible body 120 toward the first end 122 of the compressible body 120. The compressible body 120 further comprises a plurality of transverse members 160 extending from the inward pleats 182 of the first pleated side member 152 to the inward pleats 182 of the second pleated side member 154.

The transverse members 160 stabilize the compressible body 120, reducing the propensity of the compressible body 120 to twist or sag when not supported. The transverse members 160 also prevent the first and second pleated side members 152 and 154 from splaying outward when a force F is applied to the second end 126 of the compressible body 120.

Referring now to FIG. 2B, a perspective view of the compressible seal 110, the first and second pleated side members 152 and 154 have first and second pleated top edges 156 and 158. The transverse members 160 have transverse top edges 166. As shown in FIG. 2B, the first pleated top edge 156, second pleated top edge 158 and transverse top edges 166 are substantially coplanar. This substantially coplanar arrangement allows a substantially planar surface, such as part of the base of a recreational vehicle slide out, to slide smoothly across the top edges 156, 158, and 166, which allows the compressible seal 110 to prevent light and moisture from entering the interior of the recreational vehicle between the base and the seal as the base slides across the top edges.

FIGS. 3A-F depict a compressible seal 210 in accordance with a second embodiment of the disclosure. Among other applications, compressible seal 210 is useful for sealing the base of a recreational vehicle slide out to the frame of the recreational vehicle.

Referring to FIG. 3A, the compressible seal 210 comprises a compressible body 220, a non-compressible body 230, and a flange 240. The compressible body 220 has a first end 222 and a second end 226. The non-compressible body 230 is joined to the first end 222 of the compressible body 220. The flange 240 is joined to the non-compressible body 230 opposite the compressible body 220 and may be used for securing the seal 210 to an object, such as a recreational vehicle frame.

The compressible body 220 comprises a first pleated side member 252 and a second pleated side member 254. The first and second pleated side members 252 and 254 extend from the first end 222 to the second end 226 of the compressible body 220. The first and second pleated side members 252 and 254 comprise a plurality of alternating inward pleats 282 and outward pleats 284. The pleated structure of the first and second pleated side members 252 and 254 allows the compressible body 220 to compress when a force F is applied to the second end 226 of the compressible body 220 toward the first end 222 of the compressible body 220.

The compressible body 220 further comprises a plurality of transverse members 260 extending from the inward pleats 282 of the first pleated side member 252 to the inward pleats 282 of the second pleated side member 254. In the compressible seal 210 shown in FIG. 3A, the compressible body 220 has five transverse members 260. However, a person of ordinary skill would understand that variations of the compressible seal 210 having more or less than five transverse members 260 also fall within the scope of this disclosure. The compressible body 220 further comprises a first end member 224 extending from the first pleated side member 252 to the second pleated side member 254 at the first end 222 of the compressible body 220 and a second end member 228 extending from the first pleated side member 252 to the second pleated side member 254 at the second end 226 of the compressible body 220.

The transverse members 260 and the first and second end members 224 and 228 stabilize the compressible body 220 of the compressible seal 210, reducing the propensity of the compressible body 220 to twist or sag when not supported. The transverse members 260 also prevent the first and second pleated side members 252 and 254 from splaying outward when a force F is applied to the second end 226 of the compressible body 220.

The non-compressible body 230 of the compressible seal 210 is joined to the first end 222 of the compressible body 220. The non-compressible body 230 comprises a rigid base 232 and flaps 234a and 234b extending from the rigid base 232 to flap top edges 236a and 236b. The flaps 234a and 234b include a first flap 234a opposite the compressible body 220 and a second flap 234b on the side of the non-compressible body 230 adjacent the second pleated side member 254. The flaps 234a and 234b are not joined to one another (except through the rigid base 232) and therefore are able to flex independently of one another.

In the compressible seal 210, as shown in FIG. 3A, the rigid base 232 of the non-compressible body 230 is made rigid by a perpendicular matrix 238 of stabilizing members 239. However, a person of ordinary skill would understand that variations of the compressible seal 210 in which the rigidity of the rigid base 232 is provided by other structures, such as a solid block of the material used to make the compressible seal 210, also fall within the scope of this disclosure. The non-compressible body 230 further comprises a sealing gasket 233 joined to the rigid base 232 adjacent the first pleated side member 252, which can provide a seal between the rigid base 232 and a frame to which the compressible seal 210 is mounted, such as a recreational vehicle frame.

Referring now to FIG. 3B, the first and second pleated side members 252 and 254 have first and second pleated top edges 256 and 258. The second pleated side member 254 slopes outward from the bottom to the top of the compressible body 220, such that the bottom of the compressible body 220 is narrower than the top of the compressible body 220. This design reduces the amount of material needed to manufacture the compressible seal 210 without reducing the area at the top of the compressible body 220 available for sealing to a movable surface, such as the base of a recreational vehicle slide out.

As shown in FIG. 3B, the second pleated side member 254 comprises a bottom portion 254a and a top portion 254b. The angle of the top portion 254b, relative to vertical (when viewed from the perspective of FIG. 3B), is greater than the angle of the bottom portion 254a such that the top portion 254b is flared outward. This flared design allows the top of the second pleated side member 254 to flex outward more readily when a downward force is applied to the top of the second pleated top edge 258.

Referring now to FIGS. 3B and 3C, the compressible body 220 further comprises a pleated bottom member 272 at the bottom of the compressible body 220. As shown in FIG. 3B, the pleated bottom member 272 extends from the bottom of the first pleated side member 252 to the bottom of the second pleated side member 254. As shown in FIG. 3C, the pleated bottom member 272 also extends from the first end 222 to the second end 226 of the compressible body 220. The pleated bottom member 272 comprises a plurality of alternating upward pleats 286 and downward pleats 288 aligned with the inward pleats and outward pleats, respectively, of the first and second pleated side members. The pleated bottom member 272 further stabilizes the compressible body 220.

Referring now to FIG. 3D, a cross-sectional view of the compressible seal 210, the transverse members 260 each comprise a joined portion 262 and a free portion 264. The joined portions 262 are joined to the first and second pleated side members 252 and 254 and to the pleated bottom member 272. The free portions 264 extend from the joined portions 262 to transverse top edges 266 and are not joined to the first or second pleated side members 252 and 254 or to the pleated bottom member 272 (except through the joined portions 262). Rather, slits 268 between the free portions 264 and the first and second pleated side members 252 and 254 allow the free portions 264 to flex independently of the first and second pleated side members 252 and 254.

Referring now to FIG. 3E, a perspective view of the compressible seal 210, the first pleated top edge 256, second pleated top edge 258, transverse top edges 266, flap top edges 236a and 236b, and the top edges 225 and 229 of the first and second end members 224 and 228 are substantially coplanar. This substantially coplanar arrangement allows a substantially planar surface, such as part of the base of a recreational vehicle slide out, to slide smoothly across the top edges 256, 258, 266, 236a, 236b, 225, and 229, which allows the compressible seal 210 to prevent light and moisture from entering the interior of the recreational vehicle between the base and the seal as the base slides across the top edges.

FIG. 3F is an environmental perspective view of the compressible seal 210 mounted to a recreational vehicle frame 510 below the base of a slide out 520. The slide out 520 is in a partially extended position.

The frame 510 includes a body panel 512 and a platform 514. The platform 514 comprises an interior floor portion 514a, a depressed portion 514b for accepting the slide out 520 when the slide out 520 is in the extended position, and an exterior face 514c. As shown in FIG. 3F, the exterior face 514c of the platform 514 is recessed relative to the body panel 512.

The slide out 520 occupies an opening 518 in the body panel 512. The slide out 520 includes a face panel 522, a base 524, and side walls 526. When the slide out 520 is in the retracted position, the base 524 rests on the interior floor portion 514a of the platform 514. As the slide out 520 moves toward the extended position, the base 524 slides across the platform 514. Upon reaching the extended position, the base 524 is lowered into the depressed portion 514c of the platform 514.

As shown in FIG. 3F, the compressible seal 210 is secured to the frame 510 below the base 524 of the slide out 520. The non-compressible body 230 is secured to the exterior face 514c of the platform 514. The non-compressible body 230 fills some or all of the distance between the exterior face 514c and the body panel 512. The compressible body 220 extends outward from the non-compressible body 230. The sealing gasket (not shown) on the non-compressible body 230 prevents light from entering the interior 530 of the recreational vehicle between the compressible seal 210 and the frame 510. For clarity, the transverse members (feature 260 in FIG. 3A) and the first and second end members (features 224 and 228 in FIG. 3A) of the compressible body 220 are not shown in FIG. 3F. However, it will be understood that these features are present.

When the slide out 520 is in the retracted position (not shown), the face panel 522 presses against the second end 226 of the compressible body 220, compressing the compressible body 220 to a compressed configuration. The pleated top edges 256 and 258, transverse top edges (not shown), flap top edges 236a and 236b, and the top edges of the first and second end members (not shown) extend above the top surface of the platform 514 and contact the bottom side of the base 524 of the slide out 520. The distance by which the top edges extend above the platform 514 is determined by the tolerance between the bottom side of the base 524 and the top surface of the platform 514. The contact between the top edges and the slide out base 524 prevents light and moisture from entering the interior 530 of the recreational vehicle from outside the vehicle 540.

As the slide out 520 moves from the retracted position to the extended position, as shown in FIG. 3F, the base 524 slides across the pleated top edges 256 and 258, transverse top edges (not shown), flap top edges 236a and 236b, and the top edges of the first and second end members (not shown) The flexibility of the flaps, pleated side members, and transverse members of the compressible seal 210 allow the top edges to maintain contact with the base 524 of the slide out 520 as the slide out 520 moves toward the extended position. This contact continues to prevent light and water from entering the interior 530 of the recreational vehicle from outside the vehicle 540.

When the slide out 520 is in the fully extended position (not shown), the base 524 is lowered into the depressed portion 514c of the platform 514. The flexibility of flaps, pleated side members, and transverse members of the compressible seal 210 allows these members to bend to allow the slide out 520 to be lowered into the depressed portion 514c and simultaneously allows the top edges to maintain contact with the base 524. As before, this contact prevents light and water from entering the interior 530 of the recreational vehicle from outside the vehicle 540.

When the slide out 520 moves from the extended position to the retracted position, the base 524 again slides across the pleated top edges 256 and 258, transverse top edges (not shown), flap top edges 236*a* and 236*b*, and the top edges of the first and second end members (not shown). The top edges provide a wiping action on the bottom of the slide out base 524, removing dirt and water that may have collected on the base 524 while the slide out 520 was in the extended position.

While the present invention has been described in terms of certain embodiments, it will be understood that the invention is not limited to the disclosed embodiments, and a person of ordinary skill may make various modifications without departing from the scope of the following claims.

What is claimed is:

1. A compressible seal for sealing an interface between a recreational vehicle slide out and a recreational vehicle frame, comprising:
    a compressible body having a first end and a second end, the compressible body comprising:
        a plurality of pleated side members extending from the first end to the second end and having pleated top edges; and
        a plurality of transverse members extending between adjacent pleated side members and having transverse top edges;
        wherein the compressible body is compressible when acted upon by a compression force acting in a compression direction from the second end toward the first end.

2. The compressible seal of claim 1, wherein the plurality of pleated side members comprises a first pleated side member and a second pleated side member adjacent to the first pleated side member, the first and second pleated side members having inward pleats and outward pleats, wherein the transverse members extend from inward pleats of the first pleated side member to inward pleats of the second pleated side member.

3. The compressible seal of claim 1, wherein each transverse member has a joined portion joined to the pleated side members and a free portion extending from the joined portion to the transverse top edge, wherein the free portion is free to flex independently of the pleated side members.

4. The compressible seal of claim 1, wherein the compressible body further comprises a pleated bottom member extending between adjacent pleated side members and from the first end to the second end.

5. The compressible seal of claim 4, wherein the joined portions of the transverse members are joined to the pleated bottom member.

6. The compressible seal of claim 1, wherein the pleated top edges and the transverse top edges are substantially coplanar.

7. The compressible seal of claim 1, wherein the compressible body has sufficient stability to substantially avoid sagging when the first end of the compressible body is attached to another object, and the compressible body extends substantially horizontally from the object.

8. The compressible seal of claim 2, wherein the second pleated side member comprises a top portion and a bottom portion, and the top portion is flared outward relative to the bottom portion.

9. The compressible seal of claim 1, further comprising a non-compressible body joined to the first or second end of the compressible body.

10. The compressible seal of claim 9, wherein the non-compressible body comprises a rigid base and one or more flaps, each flap extending from the rigid base to a flap top edge.

11. The compressible seal of claim 10, wherein the pleated top edges, the transverse top edges, and the flap top edges are substantially coplanar.

12. The compressible seal of claim 1, wherein the pleated side members each have a length, as measured along a straight line from the first end to the second end of the compressible body when the compressible body is in an expanded configuration, between 2.5 inches and 7 inches.

13. A method for sealing an interface between a recreational vehicle slide out having a base and a face panel and a recreational vehicle frame, comprising:
    securing a compressible seal to the frame under the base of the slide out, the compressible seal comprising:
        a compressible body having a first end and a second end, the compressible body comprising:
            a plurality of pleated side members extending from the first end to the second end and having pleated top edges; and
            a plurality of transverse members extending between adjacent pleated side members and having transverse top edges;
            wherein the compressible body is compressible when acted upon by a compression force acting in a compression direction from the second end toward the first end;
    wherein the compressible seal is positioned such that the base of the slide out slides over the pleated top edges and the transverse top edges, and the face panel compresses the compressible body, when the slide out moves from an extended position to a retracted position.

14. The method of claim 13, wherein the plurality of pleated side members comprises a first pleated side member and a second pleated side member adjacent to the first pleated side member, the first and second pleated side members having inward pleats and outward pleats, wherein the transverse members extend from inward pleats of the first pleated side member to inward pleats of the second pleated side member.

15. The method of claim 13, wherein each transverse member has a joined portion joined to the pleated side members and a free portion extending from the joined portion to the transverse top edge, wherein the free portion is free to flex independently of the pleated side members.

16. The method of claim 13, wherein the pleated top edges and the transverse top edges are substantially coplanar.

17. The method of claim 13, wherein the compressible seal further comprises a non-compressible body joined to the first or second end of the compressible body.

18. The method of claim 17, wherein the non-compressible body comprises a rigid base and one or more flaps, each flap extending from the rigid base to a flap top edge, wherein the pleated top edges, the transverse top edges, and the flap top edges are substantially coplanar.

19. The method of claim 13, wherein the pleated side members each have a length, as measured along a straight line from the first end to the second end of the compressible body when the compressible body is in an expanded configuration, between 2.5 inches and 7 inches.

* * * * *